United States Patent
Kobayashi et al.

(10) Patent No.: US 7,289,314 B2
(45) Date of Patent: Oct. 30, 2007

(54) METAL FOIL FOR CAPACITOR, SOLID ELECTROLYTIC CAPACITOR USING THE FOIL AND PRODUCTION METHODS OF THE FOIL AND THE CAPACITOR

(75) Inventors: Kenki Kobayashi, Nagano (JP); Toru Sawaguchi, Nagano (JP); Hiroshi Konuma, Nagano (JP)

(73) Assignee: Showa Denko K.K., Tokyo (JP)

( * ) Notice: Subject to any disclaimer, the term of this patent is extended or adjusted under 35 U.S.C. 154(b) by 290 days.

(21) Appl. No.: 10/523,818

(22) PCT Filed: Aug. 29, 2003

(86) PCT No.: PCT/JP03/11058

§ 371 (c)(1),
(2), (4) Date: Feb. 4, 2005

(87) PCT Pub. No.: WO2004/021380

PCT Pub. Date: Mar. 11, 2004

(65) Prior Publication Data

US 2006/0046417 A1    Mar. 2, 2006

Related U.S. Application Data

(60) Provisional application No. 60/407,974, filed on Sep. 5, 2002.

(30) Foreign Application Priority Data

Aug. 30, 2002 (JP) ............................ 2002-253753

(51) Int. Cl.
*H01G 9/00* (2006.01)

(52) U.S. Cl. ............... 361/523; 361/525; 361/528; 361/529; 361/534; 29/25.01; 29/25.03
(58) Field of Classification Search ........ 361/502–534; 29/25.01, 25.03
See application file for complete search history.

(56) References Cited

U.S. PATENT DOCUMENTS

| 5,473,503 | A | * | 12/1995 | Sakata et al. | 361/525 |
| 5,586,001 | A | * | 12/1996 | Amano et al. | 361/525 |
| 5,968,210 | A | * | 10/1999 | Strange et al. | 29/25.03 |
| 6,449,140 | B1 | * | 9/2002 | Sakai et al. | 29/25.03 |
| 6,462,936 | B1 | * | 10/2002 | Fujimoto et al. | 29/25.03 |
| 6,890,363 | B1 | * | 5/2005 | Sakai et al. | 29/25.03 |
| 7,070,631 | B2 | * | 7/2006 | Monden et al. | 29/25.03 |

FOREIGN PATENT DOCUMENTS

| JP | 5-283304 A | 10/1993 |
| JP | 7-169657 A | 7/1995 |
| JP | 7-235456 A | 9/1995 |
| JP | 11-307400 A | 11/1999 |
| WO | WO 02/063645 A1 | 8/2002 |

\* cited by examiner

*Primary Examiner*—Nguyen T. Ha
(74) *Attorney, Agent, or Firm*—Sughrue Mion Pllc.

(57) ABSTRACT

A metal foil for capacitor element is produced through a process including steps of etching and ten electrochemically forming a metal foil after making cut lines each in a shape of a capacitor element with at least a part of a portion predetermined to be an anode-leading-out-part left uncut. The step of etching the foil is preferably performed with the anode-leading-out-parts being protected by protective material. Solid electrolytic capacitor elements prepared by using the metal foil have narrow variation in capacitance.

28 Claims, 3 Drawing Sheets

(A)

(B)

(C)

(D)

ical Field

The present invention relates to a method for producing a metal foil for capacitors used in various electronic instruments, and a capacitor prepared by using the foil. More specifically, the present invention relates to a method for etching and electrochemically forming a metal foil for multilayer solid electrolytic capacitors, and a solid electrolytic capacitor using a metal foil obtained by the method.

BACKGROUND ART

Developments of chip-type or small-size electronic components are aggressively proceeding to cope with the requirement for downsizing of electronic instruments, high-density packaging of print substrates, promotion of packaging efficiency and the like. Along with the developments, requirement for production of chip-type or small-size electrolytic capacitors used as components is increasing. In this point and also in view of easy handleability, development and dissemination of solid electrolytic capacitors not using an electrolytic solution are abruptly growing in recent years.

Generally, a chip-type solid electrolytic capacitor is composed by forming an oxide dielectric film on an etched valve-acting metal foil and thereon forming cut-out grooves each in the element form (see, JP-A-5-283304 (the term "JP-A" as used herein means an "unexamined published Japanese patent application), or by a process where after fixing foils each cut out into an element shape on a metal-made support and thereon forming a solid electrolyte, a cathode electrically conducting layer comprising carbon paste and silver paste is formed thereon and an outer jacket part enclosing the whole is formed.

Among valve-acting metals such as aluminum, tantalum, niobium and titanium, aluminum is advantageous in that the surface area can be easily enlarged by an etching treatment and the oxide film formed on the surface by anodization (electrochemical formation) using the aluminum as the anode can be used as a dielectric material, therefore, a small capacitor having a large capacitance can be produced at a low cost as compared with other capacitors. By virtue of these properties, an aluminum solid electrolytic capacitor particularly for low voltage use is widely used.

Presently, the electrode foil for use in the aluminum solid electrolytic capacitor is an aluminum foil which is electrochemically or chemically etched to enlarge the surface area and then subjected to punching into the shape of a product pattern and electrochemical formation of the cut end part.

Methods for etching an aluminum foil include a DC (direct current) electrolytic etching method where an aluminum foil is etched in an electrolytic solution comprising a chloride ion-containing aqueous solution having added thereto a phosphoric acid, a sulfuric acid, a nitric acid or the like by passing a DC current using the aluminum foil as the positive electrode and an electrode disposed adjacently to the aluminum foil as the negative electrode, and an AC (alternating current) electrolytic etching method where an aluminum foil is etched in an electrolytic solution comprising a chloride ion-containing aqueous solution having added thereto a phosphoric acid, a sulfuric acid, a nitric acid or the like by passing an AC current between electrodes disposed at both sides of the aluminum foil (indirect supply of electricity) or between the aluminum foil and each of the electrodes disposed at both sides thereof (direct supply of electricity).

In the DC electrolytic etching, the etching proceeds while forming tunnel-like pits in crystallographic orientation. On the other hand, in the AC current electrolytic etching, the etching proceeds while forming etching pits sequentially connected like a rosary in random directions and this is advantageous for enlarging the surface area (area enlargement). Therefore, AC electrolytic etching is predominantly performed for the etching of an aluminum foil, however, a method of combining these two methods and a method of gradually increasing the AC voltage have been also proposed (see, JP-A-11-307400). In addition, a method involving adjustments of the waveform, amplitude and the like of the AC to improve the effective area enlargement (JP-A-7-235456) and a method where aluminum comprising a specific metal which works as a starting point of etching corrosion is used (JP-A-7-169657) have been also proposed.

After a valve-acting metal foil is formed into a porous valve-acting metal foil by electrochemical etching or after a dielectric layer is formed thereon, when the foil is cut into a capacitor element shape, cracks are generated in the porous layer formed by etching in the vicinity of cut face, and burrs are generated in the cut end part to render the part rough.

These cracks, burrs and the like on the cut edge surface generated at the time of cutting give rise to deterioration of capacitor properties.

In a step of attaching electrically conducting polymer to the foil to form a cathode part, masking is applied to the boundary between the anode-leading-out-part and the cathode part for the purpose of preventing the treating solution from creeping up to the anode-leading-out-part. However, electrically conducting polymer easily spreads beyond the masking material toward the anode part, which results in increase of leakage current.

WO 02/063645 has proposed a method where an etching layer is formed on the cut edge surface of a foil cut out into a capacitor element shape by electrolytic etching and at this time, burrs on the cut edge part are dissolved. However, in this method, etching is likely to be localized on the cut end part of the foil and this makes it difficult to control the current distribution, and another problem is involved that the cut edge part is dissolved or the strength of the part is decreased so quickly that effective area of the element decreases, failing in achieving a mass-production process of etched foils having a stable quality.

DISCLOSURE OF INVENTION

An object of the present invention is to provide a chemically formed foil for producing capacitors having a uniform shape with narrow variation in capacitance, and a production method of the foil.

Another object of the present invention is to provide capacitor elements using the foil and a production method thereof.

The present inventors have completed the present invention based on the findings that production of metal foils for capacitors with a narrow variation in capacitance can be achieved by a process involving the steps: making a number of cut lines having a predetermined fine width in valve-acting metal foil material such that each cut portion has a shape of an anode for a capacitor element for the purpose of producing capacitor elements in quantity at a time; etching the surface of the metal foil and the cut edge surface; and performing electrochemical formation.

Also, the present inventors have found that etching layers can be formed only on the portions to be cathode parts by performing etching after protecting the portions to be anode-leading-out-parts of capacitor elements with a protective material, so that, in a subsequent step of attaching electrically conductive polymer to the cathode parts, the anode-leading-out-parts can be satisfactorily prevented from the treating solution creeping up by masking, and as a result, production of a capacitor having properties of stable capacitance and reduced leakage current can be achieved.

More specifically, the present invention relates to the following valve-acting metal foil for capacitor, solid electrolytic capacitor using the foil and production methods of the foil and the capacitor:

1) a method for producing a metal foil for capacitors, comprising a step of making cut lines in a valve-acting metal in a shape of a capacitor element with at least a part of a portion predetermined to be an anode-leading-out-part left uncut, a step of etching the cut edge surface generated in the previous step and the surface part of the valve-acting metal foil, and a step of electrochemically forming the metal foil;

2) the method for producing a metal foil for capacitors as described in 1 above, wherein the etching is performed after protecting the portion predetermined to be the anode-leading-out-part of a capacitor element with a protective material;

3) the method for producing a metal foil for capacitors as described in 2 above, wherein the protective material is removed after etching, and then the step of electrochemically forming is performed;

4) the method for producing a metal foil for capacitors as described in 2 above, wherein the protective material is removed after electrochemically forming the etched foil;

5) the method for producing a metal foil for capacitors as described in 2 above, wherein the protective material is removed after etching, and masking is applied to the boundary between the anode-leading-out-part and the region to have a solid electrolytic layer formed thereon as a cathode part before performing the step of electrochemically forming the region to be a cathode part;

6) the method for producing a metal foil for capacitors as described in any one of 1 to 3 above, wherein each of the cut portions has a quadrangular-shape having uncut portion, U-shape(horseshoe-shape) or semicircular shape;

7) the method for producing a metal foil for capacitors as described in 1 above, wherein the cut edge surface has an acute interior angle A of 30° or more with respect to the metal foil surface;

8) the method for producing a metal foil for capacitors as described in 1 above, wherein the width d of the cut line is twice or less the thickness of the metal foil;

9) the method for producing a metal foil for capacitors as described in 1 above, wherein a plurality of metal foils for capacitors is produced in a single batch process by making a plurality of cut lines each having a shape of a capacitor element in a single valve-acting metal foil;

10) the method for producing a metal foil for capacitors as described in 1 above, wherein the foil consists of at least one valve-acting metal selected from a group of aluminum, niobium and tantalum;

11) the method for producing a metal foil for capacitors as described in 1 above, wherein the valve-acting metal foil has a thickness of 0.05 to 1 mm;

12) the method for producing a metal foil for capacitors as described in 1 above, wherein the valve-acting metal foil is an aluminum foil containing at least one element selected from the group consisting of Si, Fe, Cu, Zn, Ni, Mn, Ti, Pb, B, P, V and Zr;

13) the method for producing a metal foil for capacitors as described in 12 above, wherein the total content of the elements other than aluminum contained in the foil is from 1 to 1,000 ppm by mass in terms of atom;

14) the method for producing a metal foil for capacitors as described in 12 above, wherein the aluminum foil contains Si in an amount from 1 to 100 ppm by mass, Fe in an amount of from 1 to 100 ppm by mass and Cu in an amount of from 1 to 100 ppm by mass;

15) the method for producing a metal foil for capacitors as described in 1 above, wherein the etching is AC electrolytic etching using at least one waveform selected from the group consisting of sine wave, rectangular wave and triangular wave;

16) the method for producing a metal foil for capacitors as described in 1 above, wherein the etching is AC electrolytic etching where terminals are provided on the valve-acting metal and on electrodes placed to both sides of the valve-acting metal and AC current is directly supplied to the terminal provided on the valve-acting metal;

17) the method for producing a metal foil for capacitors as described in 1 above, wherein the etching is DC electrolytic etching;

18) a metal foil for capacitors, obtained by the production method described in any one of 1 to 17 above;

19) the metal foil for capacitors as described in 18 above, wherein the edge of the portion to be a cathode has a curvature radius r of 0.1 to 500 μm;

20) the metal foil for capacitors as described in 18 above, comprising, on the surface of the metal foil and the cut edge surface, porous layers formed on a portion where solid electrolyte is to be formed, wherein the thickness of the porous layer on the cut edge surface, T2, is more than 1 μm, and has a following relationship with the thickness of the porous layer on the surface of the metal foil, T1:

$$T2/T1 \leq 2;$$

21) a solid electrolytic capacitor element, comprising a solid electrolyte layer and an electrically conducting layer in the order on the metal foil as described in any one of 18 to 20 above;

22) the solid electrolytic capacitor element as described in 21 above, wherein the solid electrolyte layer comprises an electrically conducting polymer;

23) the solid electrolytic capacitor element as described in 22 above, wherein a monomer of forming the electrically conducting polymer is a monomer compound containing a heterocyclic 5-membered ring or a monomer compound having an aniline skeleton;

24) the solid electrolytic capacitor element as described in 23 above, wherein the monomer compound containing a heterocyclic 5-membered ring is a compound selected from the group consisting of pyrrole, thiophene, furan, polycyclic sulfide and substitution derivatives thereof;

25) the solid electrolytic capacitor element as described in 23 above, wherein the monomer compound containing a heterocyclic 5-membered ring is a compound represented by the following formula (I):

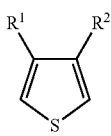
(I)

wherein the substituents $R^1$ and $R^2$ each independently represents a monovalent group selected from the group consisting of a hydrogen atom, a linear or branched, saturated or unsaturated hydrocarbon group having a carbon number of 1 to 10, an alkoxy group, an alkyl ester group, a halogen, a nitro group, a cyano group, a primary, secondary or tertiary amino group, a $CF_3$ group, a phenyl group and a substituted phenyl group, the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by the groups $R^1$ and $R^2$, and the combined ring chain may arbitrarily contain a bond of carbonyl, ether, ester, amide, sulfide, sulfinyl, sulfonyl or imino;

26) the solid electrolytic capacitor element as described in 23 above, wherein the monomer compound containing a heterocyclic 5-membered ring is a compound selected from 3,4-ethylenedioxythiophene and 1,3-dihydroisothianaphthene;

27) a multilayer solid electrolytic capacitor obtained by stacking a plurality of capacitor elements as described in 21 above;

28) a method for producing solid electrolytic capacitor elements, comprising a step of making cut lines each having a shape of a capacitor element with at least a part of a portion predetermined to be anode-leading-out-part left uncut in a valve-acting metal foil, a step of etching the cut edge surface generated in the previous step and the surface of the valve-acting metal foil, a step of electrochemically forming the etched metal foil to form an oxide dielectric film after cutting the foil into stripes each having a comb-like shape where foil portions each cut in a shape of an element link together in anode-leading-out-parts, a step of forming a solid electrolyte layer on the oxide dielectric film layer, a step of forming an electrically conducting layer on the solid electrolyte layer, and a step of severing the foil pieces each in a shape of a capacitor element by making a cut in the anode-leading-out-part of each piece.

BRIEF DESCRIPTION OF DRAWINGS

FIG. 1(A) is a state diagram showing a valve-acting metal foil having a plurality of cut lines each having a shape of a capacitor element for the purpose of fabricating a plurality of capacitor elements from the single metal foil.

FIG. 1(B) is a state diagram showing the valve-acting metal foil of FIG. 1(A) with the portions predetermined to be anode-leading-out-parts of capacitor elements being protected with protective material.

FIG. 1(C) is a state diagram showing the valve-acting metal foil of FIG. 1(B) with the protective material being removed from portions to be anode-leading-out-parts of capacitor elements after etching the whole foil.

FIG. 1(D) is a state diagram showing the portions to be cathodes of capacitor elements being electrochemically formed after cutting out of the valve-acting metal foil of FIG. 1(C) in a shape of a comb.

DETAILED DESCRIPTION OF INVENTION

The methods of the present invention are described below.

(1) Valve-Acting Metal

The valve-acting metal foil for use in the present invention is a metal foil having a valve action, such as aluminum, niobium, tantalum, aluminum alloy, niobium alloy and tantalum alloy. The metal used in the present invention may be in form of a plate as well as a foil. Preferred examples thereof include a foil of aluminum or aluminum alloy, which is commercially available as a roll or a plate. The thickness may be sufficient if it is in a range for enough strength of the aluminum foil to be ensured after etching. The thickness is, for example, from 0.05 to 1 mm, preferably from 0.08 to 0.4 mm, more preferably from 0.1 to 0.2 mm.

The aluminum may contain at least one element selected from the group consisting of Si, Fe, Cu, Zn, Ni, Mn, Ti, Pb, B, P, V and Zr, and preferably the aluminum contains each of such an element in an amount of 1 to 100 ppm by mass, more preferably from 10 to 50 ppm by mass, based on the entire amount of aluminum foil, provided that the total amount of these elements is in a range of 1 to 1,000 ppm by mass.

In particular, an aluminum containing Si in an amount of 1 to 100 ppm by mass, Fe in an amount of 1 to 100 ppm by mass and Cu in an amount of 1 to 100 ppm by mass is preferred, and an aluminum containing Si in an amount of 10 to 50 ppm by mass, Fe in an amount of 10 to 50 ppm by mass and Cu in an amount of 10 to 50 ppm by mass is more preferred.

Examples of the aluminum alloy mainly consisting of aluminum include alloys of aluminum with one or more members of silicon, titanium, zirconium, tantalum, niobium and hafnium.

The size of the original valve-acting metal foil to be made cuts in is not limited, as long as it is large enough to fabricate a plurality of, for example, plate-like capacitor elements. Specifically, the valve-acting metal foil preferably has a size large enough for a plurality of capacitor elements, as a plate-like element unit, each having a width of 1 to 50 mm and a length of 1 to 50 mm, more preferably a width of 2 to 20 mm and a length of 2 to 20 mm, still more preferably a width of 2 to 5 mm and a length of 2 to 6 mm, to be taken out.

(2) Formation of Cut Lines

The step of making cut lines in the foil is described by referring to drawings.

Figure 1:
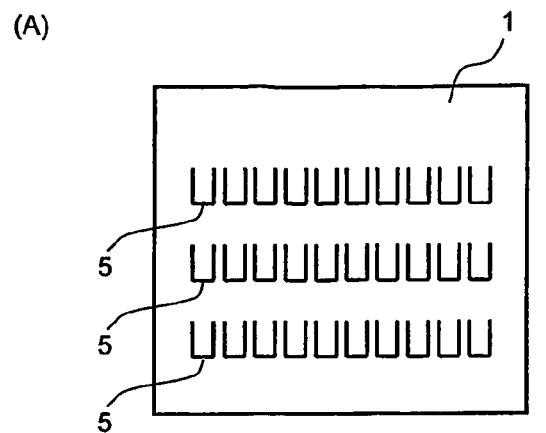
FIG. 1 is a schematic view for explaining the process of producing the metal foil for capacitors of the present invention.
Figure 1:
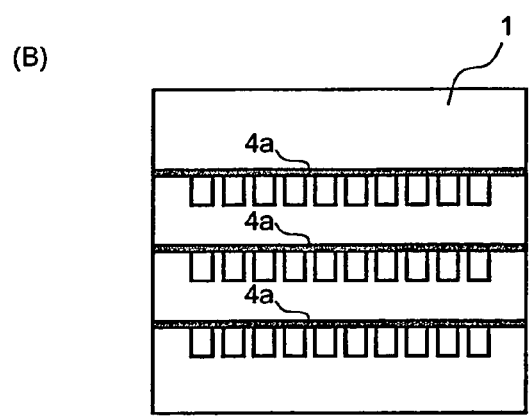
Figure 1:
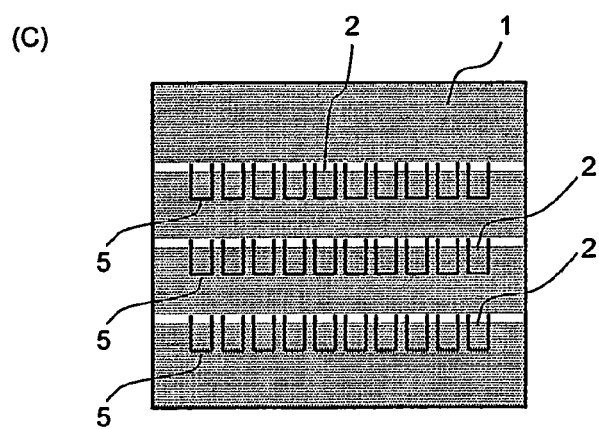
Figure 1:
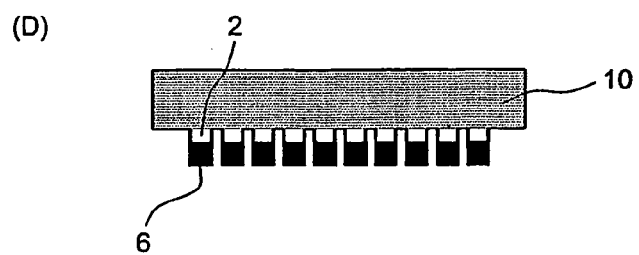

In an embodiment as shown by FIG. 1(A), cut lines (cut grooves) 5 having a predetermined line width and each forming a shape of a capacitor element with at least a part of a portion to be an anode-leading-out-part left uncut, are formed for the purpose of fabricating 30 total (in 10 rows×3 lines) from the single foil (plate).

Figure 2:
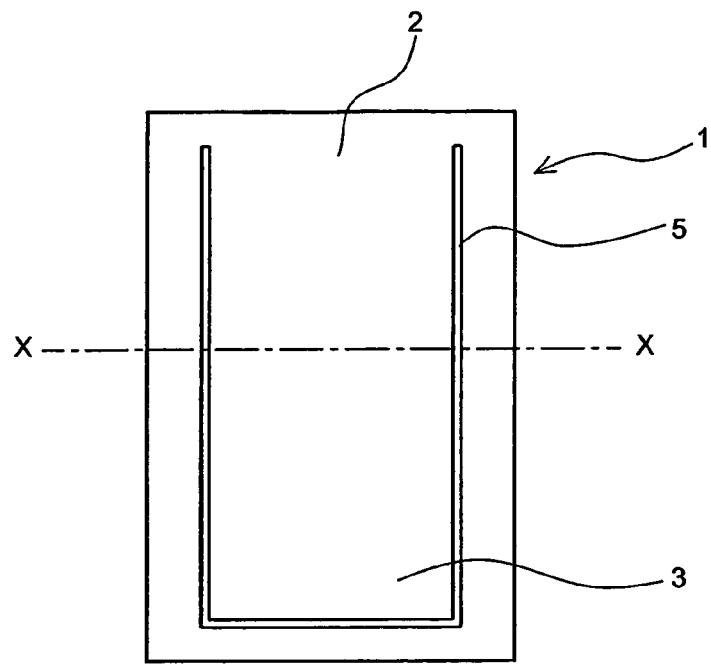
FIG. 2 is an enlarged view of FIG. 1(A) showing a cut made in a shape of a capacitor element in a valve-acting metal foil.

As shown by FIG. 2 which is an enlarged view of FIG. 1(A), the cut line (cut groove) 5 is made, leaving uncut a portion 2 predetermined to be the anode-leading-out-part or to take out anode electricity in the final capacitor element. In this embodiment, the cut line has a square shape with one side open (uncut), but the cut line may have any shape such as quadrangular shape with its corner(s) being angular or rotundate, U shape (horseshoe shape) and semicircular shape as long as it can form a capacitor element. In FIG. 2, only one cut line is shown but a plurality of cut lines may be formed on the valve-acting metal foil at one time or by lots and the arrangement of the cut lines is not limited to the one shown in FIG. 1(A), as long as the arrangement causes no problem in the later steps.

Figure 3:
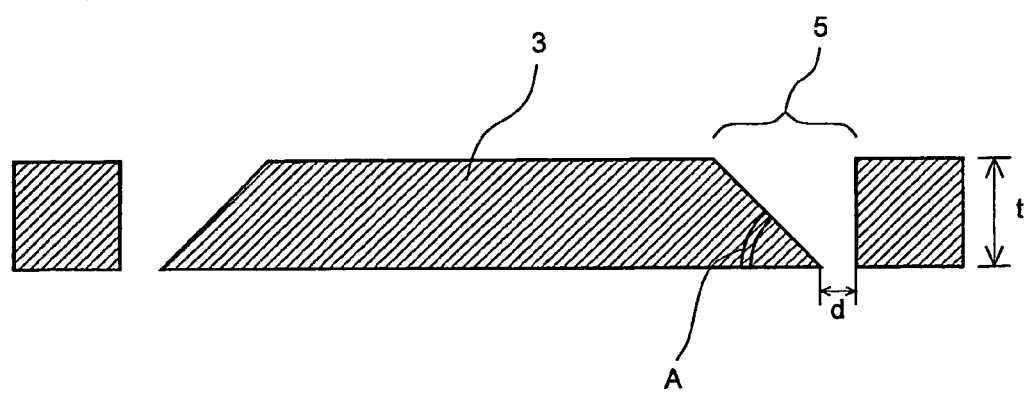
FIG. 3 is a cross-sectional view of x-x of FIG. 2.

FIG. 3 is a view schematically showing the cross section along the X-X line in FIG. 2. The width d of the cut line (in the case where the width differs between front and back surfaces of the foil, d represents the smaller width) needs to be twice or less the thickness of the foil. For example, in electrolytic etching, since the dissolving amount of the valve acting metal is mainly dominated by quantity of electricity and shapes of pores and grooves formed in the etching process are greatly influenced by current density, it is important to adjust electric current properly.

In the etching process using direct supply of electricity where a terminal is provided on the valve acting metal foil, the electric current goes to and fro between the foil and the counter electrodes. Accordingly, provided that the foil and electrodes are parallel with each other, the electric current flows in the vertical direction against the surfaces of the foil and the electrodes. However, in a case where the foil has a cut line, the electric current does not flow straight vertically but flows forward the cut edge or cut surface of the cut line. On the other hand, the current flows through a route to which resistance becomes small. That is, the electricity which flows from a portion of an electrode near the cut line tends to go toward not the plain surface of the foil but the cut edge or cut surface of the cut line. Therefore, the larger the width of the cut line is, the more electricity converges on the cut edges to intensively etch the cut edges.

The surface area of the foil decreases by the width of the cut line formed thereon, and increases by the cut surface area. That is, the narrower the cut line, the less electricity converges on the cut edges and cut surfaces of the cut line, thus preventing the cut edges from being excessively dissolved.

Specifically, assuming that the thickness of the foil is t and the width of the cut line is d, if the cut edge surface is formed vertically against the plane surface of the foil, the value of decrease in the whole surface area of the foil is 2d and the value of increase is 2t. The larger "2d" the increase value "2t" is than the decrease value, the more likely the electric currents converge on the cut edges. For the purpose of preventing excessive dissolution of the cut edge surface, it is preferable that the decrease value (2d) is twice or less the increase value (2t), that is, $2t \times 2 \geq 2d$. In other words, formation of the cut line having the width d which is twice or less the foil thickness t contributes to alleviation of electricity conversion, thereby preventing excessive dissolution of the cut edge surface.

Generally, the metal foil used in the present invention is 1 mm or less, preferably 0.4 mm or less, more preferably 0.2 mm or less. Accordingly, the width of the cut line is 2 mm or less, preferably 0.8 mm or less, more preferably 0.4 mm or less. If the width exceeds 2 mm, the electric currents converge on the cut edge surface and the cut edge surface is locally dissolved to cause decrease in the effective area of the element and consequently reduction in the capacitance.

The cut line may be formed, for example, by cutting with a cutter, Thomson blade cutting, mold punching or laser cutting. The cut is made on an angle such that either one of the front surface and the back surfaces of the foil forms an obtuse interior angle with the cut surface while the other surface forms an acute interior angle A with the cut surface (in the embodiment shown in FIG. 3, the front surface of the foil forms an obtuse interior angle with the cut surface while the back surface forms an acute interior angle with the cut surface). In the present invention, the acute angle A is preferably 30° or more, more preferably 50° or more. If the angle is less than 30°, etching proceeds from the sharp-edged portion and the potion is dissolved out excessively, as a result, the effective area is decreased, which causes a wider variation in the capacitance.

(3) Etching

In etching the metal foil after cut lines are formed on the valve-acting metal foil, the etching is performed by dipping the whole metal foil in an electrolytic solution prepared by adding a phosphoric acid, a sulfuric acid, a nitric acid, an acetic acid, an oxalic acid or the like to an aqueous solution containing chloride ion.

The electrolytic solution used for the etching is a solution containing at least chloride ion and thereto, at least one of a solution containing sulfate ion, phosphate ion, acetate ion, oxalate ion or the like and a solution additionally containing alkali metal ion or alkaline earth metal ion may be added.

In an embodiment as shown in FIG. 1(B), a single valve-acting metal foil where thirty cut lines 5 each in a shape of a capacitor element are made in an arrangement of 3 lines×10 rows is subjected to etching treatment. It is preferable that portions 2 predetermined to be anode-leading-out-parts for capacitor elements are protected with protective material 4a. The protecting treatment with the protective material may be applied to both front and back surfaces of the foil as needed. This protecting treatment contributes to reduction in the ratio of defective products caused by bad electrical contact in fabrication of a multi-layer solid electrolytic capacitor composed by stacking plurality of capacitor elements.

The protective material usable in the etching step may be any material as long as it can be closely adhered to the valve-acting metal foil (for example, aluminum foil) and can be stably present on the portions to be protected without causing a reaction with the electrolytic solution (etching solution). Examples of the protective material include an acryl-base resin, a polyethylene sheet and a resist material. Square bars of such a material may be placed to sandwich the pertinent portion and fixed with a pressure-sensitive adhesive tape, or such a material may be coated on that portion. The metal foil applied with this protective material is dipped in the electrolytic solution to etch and then the protective material is removed as shown in FIG. 1(C).

The etching is preferably performed by AC etching under the conditions such that the frequency is from 1 to 1,000 Hz, the current density is from 0.025 to 4 A/cm² and the etching electricity is from 0.02 to 2,000 C/cm². It is preferred to gradually increase the current density of the AC current and thereafter perform the AC electrolytic etching at a constant electric current.

In the case of AC current, the current preferably has a waveform containing, for example, at least one of sine wave, triangular wave and rectangular wave.

Also, DC electrolytic etching and AC electrolytic etching may be used in combination by performing first DC. electrolytic etching and then AC electrolytic etching. The etching may also be performed only by DC electrolytic etching.

Whichever of the etching modes among AC, DC, or the combination thereof is employed, the current must be fed such that the valve-acting metal acts as a counter electrode to the electrodes placed to both sides thereof.

It is preferred that etching is performed by an AC electrolytic etching method where terminals are provided on the valve acting metal and on electrodes placed to both sides of the valve-acting metal, and alternate current is directly fed in between the valve-acting metal and electrodes. According to this method, the cut surface can be appropriately etched as well.

After the electrolytic etching, water washing is performed to remove the components of the electrolytic solution. Particularly, in order to reduce the remaining chloride ion, the water washing may be performed after washing the metal foil with a nitric acid solution, a sodium aluminate solution, an aluminum hydroxide solution or the like. The metal foil may be further washed with a solution containing an electrolytic solution for use in the formation of a dielectric film by anodization.

Also, chemical etching may be applied to enlarge the surface. In the chemical etching, a nitric acid, a ferric chloride or the like can be used.

In the metal foil thus obtained, the cut edge surface has a curvature radius of 0.1 to 500 μm, preferably from 1 to 100 μm, more preferably from 2 to 50 μm. If the curvature radius is less than 0.1 μm, the cut edge surface cannot exhibit an effect as a curved surface, failing in reducing leakage current.

The thickness T2 of the porous layer in the cut edge obtained by etching is preferably twice or less the thickness T1 of the porous layer in the flat surface of the metal foil. If T2 exceeds twice T1, the etching layer in the cut surface decreases in the strength and cracking occurs in the etching layer due to pressure generated at the time of stacking or sealing capacitor elements. FIG. 1(B) shows a case of applying a protective material 4a to the anode-leading-out-part 2, but in the case where protecting with a protective material is not applied, a porous layer is formed also on the anode-leading-out-part 2 by etching.

(4) Electrochemical Formation

Subsequently, the protective material, if applied in the etching treatment, is removed off as shown in FIG. 1(C). Then, the etched valve-acting metal foil is cut into comb-like metal foil strips 10 (comb-like aluminum foil strip) as shown in FIG. 1(D), and then the whole strips or at least the regions 6 which each are predetermined to have a solid electrolyte formed thereon to be a cathode part, i.e. the portions other than (and below) the portions to be anode-leading-out-parts 2 shown in FIG. 2, are subjected to electrochemical formation. Alternatively, electrochemical formation may be performed after removing the protective material and applying masking to the boundary part between the anode-leading-out-part 2 and the region to form a solid electrolyte thereon as a cathode part in a later step, or may be performed without removing the protective material.

The electrochemical formation can be performed by various methods, and the conditions for performing the electrochemical formation are not particularly limited. For example, the electrochemical formation may be performed by using an electrolytic solution containing at least one ion such as oxalate, adipate, borate or phosphate under the conditions such that the electrolytic solution concentration is from 0.05 to 20% by mass, the temperature is from 20 to 90° C., the current density is from 0.01 to 600 mA/cm$^2$, the voltage is a numerical value according to the electrochemical forming voltage of the foil treated. The conditions are preferably such that the electrolytic solution concentration is from 0.1 to 15% by mass, the temperature is from 40 to 85° C., the current density is from 0.05 to 100 mA/cm$^2$.

After the electrochemical formation, for example, a dipping treatment in phosphoric acid for improving the water resistance, or a heat treatment for strengthening the film, may be performed, if desired.

By the above treatment steps, the valve-acting metal foil of the present invention is obtained.

(5) Masking

Next, a solid electrolyte is formed to be a cathode part. If desired, masking 4b is applied as a pretreatment. The masking has a function of preventing the treating solution from creeping up onto the masked part in the steps of forming an electrolyte layer and forming an electrically conducting layer, thereby completely insulating the electrically conducting layer (cathode part) from the anode part.

The masking material which can be used is a general heat-resistant resin, preferably a heat-resistant resin soluble in or swellable with a solvent, a precursor thereof or a composition comprising an inorganic fine powder and a cellulose-base resin (see, JP-A-11-80596).

Examples thereof include polyphenylsulfone(PPS), polyethersulfone(PES), cyanic acid ester resin, fluoro-resin (tetrafluoroethylene, tetrafluoroethylene/perfluoroalkyl vinyl ether copolymer and the like), low molecular weight polyimide and derivatives thereof. Among these, preferred are polyimide having a low molecular weight, polyethersulfone, fluororesin and precursors thereof, and more preferred is polyimide having a low molecular weight.

Such a material is linearly coated as a solution or dispersion solution of an organic solvent, thermally deformed to form a polymer by heat treatment and then cured.

The masking may be performed by a method of attaching a tape made of polypropylene, polyester, silicon-base resin, fluorine-base resin or the like, or a method of forming a resin coat film part.

The masking is applied to the boundary part between the anode-leading-out-part 2 and the region 3 where a solid electrolyte 7 is formed.

(6) Formation of Solid Electrolyte

The electrically conducting polymer for forming a solid electrolyte used in the solid electrolytic capacitor of the present invention is not limited but an electrically conducting polymer having a π electron conjugate structure is preferably used and examples thereof include electrically conducting polymers containing, as a repeating unit, a structure shown by a compound having a thiophene skeleton, a compound having a polycyclic sulfide skeleton, a compound having a pyrrole skeleton, a compound having a furan skeleton or a compound having an aniline skeleton.

Among the monomers used as a starting material of the electrically conducting polymer, examples of the compound having a thiophene skeleton include a compound represented by formula (I):

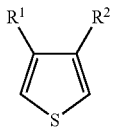

(I)

(wherein the substituents $R^1$ and $R^2$ each independently represents a monovalent group selected from the group consisting of a hydrogen atom, a linear or branched, saturated or unsaturated hydrocarbon group having a carbon number of 1 to 10, an alkoxy group, an alkyl ester group, a halogen, a nitro group, a cyano group, a primary, secondary or tertiary amino group, a $CF_3$ group, a phenyl group and a substituted phenyl group, the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by the groups $R^1$ and $R^2$, and the combined ring chain may arbitrarily contain a bond of carbonyl, ether, ester, amide, sulfide, sulfinyl, sulfonyl or imino).

Specific examples thereof include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds may be a compound available on the market or may be prepared by a known method (a method described, for example, in Synthetic Metals, Vol. 15, page 169 (1986)).

Specific examples of the compound having a polycyclic sulfide skeleton include compounds having a 1,3-dihydropolycyclic sulfide (also called 1,3-dihydrobenzo -[c] thiophene) skeleton and compounds having a 1,3-dihydronaphtho [2,3-c]thiophene skeleton. Furthermore, compounds having a 1,3-dihydroanthra[2,3-c]thiophene skeleton and compounds having a 1,3-dihydronaphthaceno [2,3-c]thiophene skeleton may be used. These compounds may be prepared by a known method, for example, the method described in JP-A-8-3156.

In addition, for example, compounds having a 1,3-dihydronaphtho [1,2-c]thiophene skeleton, 1,3-dihydrophenanthra [2,3-c]thiophene derivatives, compounds having a 1,3-dihydrotriphenylo[2,3-c]thiophene skeleton and 1,3-dihydrobenzo[a]anthraceno[7,8-c]thiophene derivatives may also be used.

A compound arbitrarily containing nitrogen or N-oxide in the condensed ring may also be used and examples thereof include 1,3-dihydrothieno[3,4-b]quinoxaline, 1,3-dihydrothieno [3,4-b]quinoxaline-4-oxide and 1,3-dihydrothieno [3,4-b]quinoxaline-4,9-dioxide, however, the present invention is not limited thereto.

Specific examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole, however, the present invention is not limited thereto. These compounds may be a commercially available compound or may be prepared by a known method.

Specific examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds may be a commercially available compound or may be prepared by a known method.

Specific examples of the compound having an aniline skeleton include derivatives such as 2-methylaniline, 2-ethylaniline, 2-propylaniline, 2-butylaniline, 2-pentylaniline, 2-hexylaniline, 2-heptylaniline, 2-octylaniline, 2-nonylanilin, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3-ethylenedioxyaniline, however, the present invention is not limited thereto. These compounds may be a commercially available product or may be prepared by a known method.

The compounds selected from the group consisting of the above-described compounds may also be used in combination to form the solid electrolyte as a copolymer. In this case, the composition ratio and the like of polymerizable monomers vary depending on the polymerization conditions and the like, but preferred composition ratio and polymerization conditions can be confirmed by a simple test. Examples of the method which can be used therefor include a method where a monomer and an oxidizing agent each preferably in the form of a solution are coated separately one after another or coated simultaneously on an oxide film layer of a metal foil to form a solid electrolyte (see, JP-A-2-15611 and JP-A-10-32145 (U.S. Pat. No. 6,214,930)). Generally, in the electrically conducting polymer, an arylsulfonic acid-base dopant such as salts of benzenesulfonic acid, toluenesulfonic acid, naphthalenesulfonic acid, anthracenesulfonic acid or anthraquionenesulfonic acid can be used as a dopant-donating agent.

Figure 4:
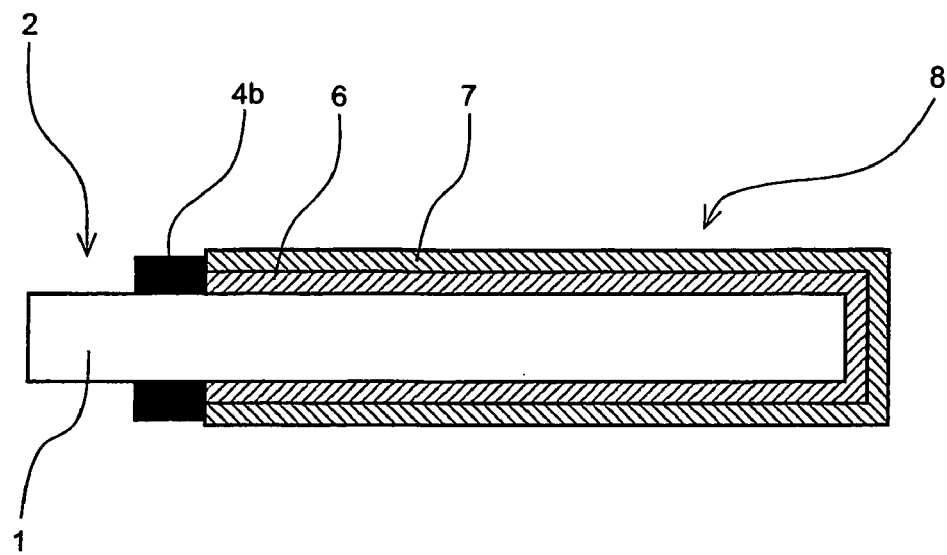
FIG. 4 is a cross-sectional view of a solid electrolytic capacitor element of the present invention.
Figure 5:
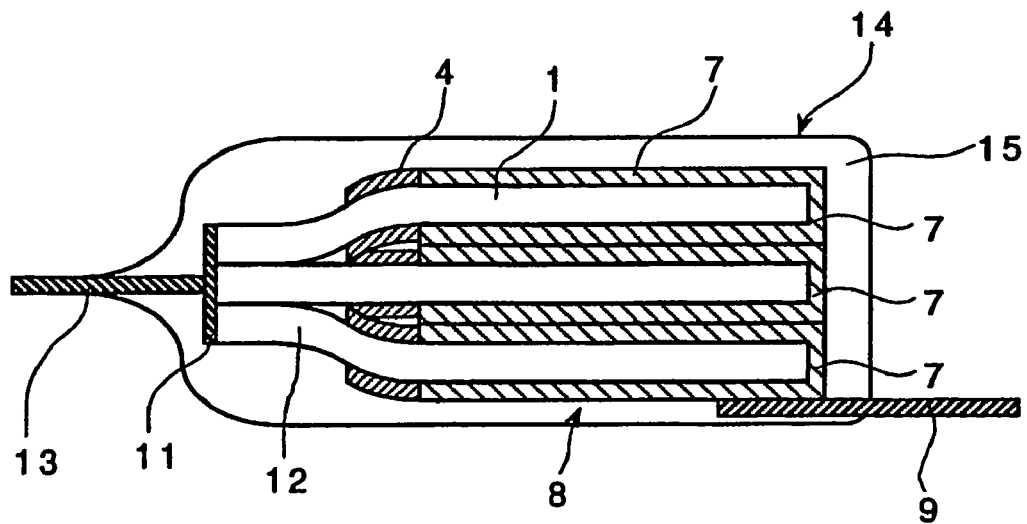
FIG. 5 is a cross-sectional view of one embodiment of a multilayer solid electrolytic capacitor fabricated from the solid electrolytic capacitor elements of the present invention.

As shown in FIG. 4, a carbon paste layer and a metal powder-containing electrically conducting layer (not shown) are provided on the surface of the solid electrolyte layer 7 to form the cathode part 8 of a capacitor. The metal powder-containing electrically conducting layer is tightly joined with the solid electrolyte layer and acts not only as the cathode but also as an adhesive layer for joining a cathode lead terminal 9 of a final capacitor product (FIG. 5). The thickness of the metal powder-containing electrically conducting layer is not limited but the thickness is generally on the order of 10 to 100 µm, preferably on the order of 10 to 50 µm.

In the case of composing a multilayer solid electrolytic capacitor by using two or more capacitor elements of the present invention, as one embodiment specifically shown in FIG. 5, a plurality of stacked capacitor elements are welded at anode-leading-out-parts, and a lead frame 11 is jointed to the edge surface of the welded part. The lead frame 11 may be chamfered, that is, may have a shape where edge corner parts are shaved and thereby slightly flattened or rounded.

Furthermore, the cathode bonding part and the anode bonding part opposing the lead frame may be rendered to undertake the roles of lead terminals 9 and 13.

The material for the lead frame is not particularly limited if it is a material generally used, but the lead frame is preferably constituted by a copper-base (for example, Cu—Ni, Cu—Ag, Cu—Sn, Cu—Fe, Cu—Ni—Ag, Cu—Ni—Sn, Cu—Co—P, Cu—Zn—Mg or Cu—Sn—Ni—P alloy) material or a material with the surface being plated with a copper-base material and when constituted as such, this provides advantages of, for example, reducing the resistance by devising the shape of the lead frame and obtaining good workability for chamfering of lead frame.

As shown in the cross-sectional view of FIG. 5, a lead terminal 13 is bonded to the lead frame 11 joined to the anode part 12, a lead terminal 9 is bonded to the cathode part 8 comprising a solid electrolyte layer 7, a carbon paste layer and a metal powder-containing electrically conducting layer, and the whole is molded with an insulating resin 15 such as epoxy resin, whereby a solid electrolytic capacitor 14 is obtained.

BEST MODE FOR CARRYING OUT THE INVENTION

The present invention is described in greater detail by referring to representative examples. These are mere examples for the purpose of explanation and the present invention is not limited thereto by any means.

EXAMPLE 1

Step of Making Cut Lines

On a 200 μm-thick aluminum foil (containing Si: 20 ppm by mass, Fe: 24 ppm by mass, Cu: 33 ppm by mass and Ti: 0.9 ppm by mass), cut lines of a rectangular shape with one side open, each having a width of 200 μm were formed. Each of the rectangular shaped cut lines to form a capacitor element had a width of 3 mm and a length of 6 mm. As shown in FIG. 1(A), cut lines for 30 capacitor elements were arranged in 3 lines×10 rows.

Etching Step

Both front and back surfaces of the portion working out to an anode-leading-out-part was covered with a 1 mm-wide resin tape as protective material (FIG. 1(B)) and then, the aluminum foil was dipped in a first electrolytic solution (10 mass % of hydrochloric acid+0.5 mass % of aqueous sulfuric acid solution) at 60° C. and etched by AC electrolytic etching under the conditions shown in Table 1.

Electrochemical Formation Step

The resin tape was removed (FIG. 1(C)) and a strip cut out in a comb-like shape from the aluminum foil by a cutter (FIG. 1(D)) was dipped in an aqueous ammonium adipate solution and applied with a voltage of 13 V to electrochemically form the electrochemically non-formed part and thereby form a dielectric film.

Masking Step

Along the anode-leading-out-part side, masking 4b with a 0.5-mm resin tape was applied to a portion 5 mm distant from the end of the portion where a solid electrolyte was to be formed on, in order to control the region for solid electrolyte 7, carbon paste and silver paste to be formed on.

Solid Electrolyte Formation Step

A solid electrolyte was formed as follows in the electrochemically formed layer region.

The capacitor element tips of the aluminum foil strips were dipped in an isopropanol solution containing 20 mass % of 3,4-ethylenedioxythiophene (Solution 1), then pulled out and left stand at 25° C. for 5 minutes. Thereafter, the aluminum foil in the portion treated with the monomer solution was dipped in an aqueous solution containing 30 mass % of an aqueous ammonium persulfate solution prepared to have a sodium 2-anthraquinonesulfonate (produced by Tokyo Kasei) concentration of 0.07 mass %, and then dried at 60° C. for 10 minutes, thereby performing the oxidative polymerization. The operation from dipping in Solution 1 until dipping in Solution 2 to perform the oxidative polymerization was repeated 25 times and thereby a solid electrolyte layer was formed. On this solid electrolyte layer, a carbon paste and a silver paste were coated. The aluminum foil was cut out from the aluminum foil strip, as a result, a solid electrolyte capacitor element 8 shown in FIG. 4 was obtained.

Fabrication and Test of Chip-Type Multilayer Solid Electrolytic Capacitor

Two solid electrolytic capacitor elements were stacked by joining these on a lead frame using a silver paste, an anode lead terminal was connected by welding to the portion where an electrically conducting polymer was not formed, the whole was molded with epoxy resin, and the obtained capacitor element was aged for 2 hours by applying a rated voltage (6.3 V) at 120° C. In this way, 150 units in total of chip-type solid electrolytic capacitors were manufactured.

The obtained multilayer solid electrolytic capacitor were subjected to a reflow test by passing each capacitor through a region at a temperature of 230° C. for 30 minutes, the leakage current 1 minute after the application of rated voltage was measured, an average leakage current (μA) of those having a measured value of 1 CV or less at a rated voltage (6.3V) was determined, those having a measured value of 0.04 CV or more were evaluated as leakage current defective, those having a capacitance 30% or more lower than the capacitance value of a capacitor estimated from the capacitance measured by dipping a capacitor element in ammonium adipate solution (15%) after electrochemical formation were evaluated as capacitance defective, those evaluated as capacitance defective were disassembled and inspected, those having disengagement of the anode electricity taking out portion from the lead were evaluated as welding defective, and the "number of defective units/number of units evaluated" was determined. The results obtained are shown in Table 2.

With respect to r and T2/T1, the values were obtained through actual measurements on optical micrographs after polishing the cut surface of the solid electrolytic capacitor obtained. In a case where a foil after etching treatment is cut out through punching in a shape of a capacitor element, since the cut edge surface is almost perpendicular to the flat surface of the foil and the cut edge surface where the core metal of the foil is exposed does not form an etching layer, the values r and T2 are both 0.

EXAMPLE 2

Multilayer solid electrolytic capacitors were fabricated in the same manner as in Example 1 except for changing the thickness of aluminum foil from 200 μm to 300 μm. The measurement of leakage current and the reflow test were performed in the same manner. The results obtained are shown in Table 2.

EXAMPLE 3

Capacitors were completed in the same manner as in Example 1 except that in the etching step, the portion working out to the anode-leading-out-part was not protected by the protective material resin tape in Example 1. These capacitor elements were evaluated on the properties in the same manner as in Example 1. The results obtained are shown in Table 2.

EXAMPLE 4

Capacitors were completed in the same manner as in Example 1 except for using pyrrole in place of 3,4-ethylenedioxythiophene in Example 1. These capacitor elements were evaluated on the properties in the same manner as in Example 1. The results obtained are shown in Table 2.

EXAMPLE 5

Capacitors were completed in the same manner as in Example 1 except for using furan in place of 3,4-ethylenedioxythiophene in Example 1. These capacitor elements were evaluated on the properties in the same manner as in Example 1. The results obtained are shown in Table 2.

EXAMPLE 6

Capacitors were completed in the same manner as in Example 1 except for using the etching current having a triangular waveform in place of the etching current having a sine waveform. These capacitor elements were evaluated on the properties in the same manner as in Example 1. The results obtained are shown in Table 2.

EXAMPLE 7

Capacitors were completed in the same manner as in Example 1 except for using the etching current having a rectangular waveform in place of the etching current having a sine waveform. These capacitor elements were evaluated on the properties in the same manner as in Example 1. The results obtained are shown in Table 2.

Comparative Example 1

Multilayer solid electrolytic capacitors were fabricated in the same manner as in Example 1 except using an aluminum foil having a thickness of 100 μm, etching the foil having no cut lines and cutting the etched foil into pieces having a predetermined size in place of steps of making cut lines and then etching in Example 1. The measurement of leakage current and the reflow test were performed in the same manner. The results obtained are shown in Table 2.

Comparative Example 2

Multilayer solid electrolytic capacitors were fabricated in the same manner as in Example 1 except for making cuts in the aluminum foil such that the acute angle A is 20°. The measurement of leakage current and the reflow test were performed in the same manner. The results obtained are shown in Table 2.

Comparative Example 3

Multilayer solid electrolytic capacitors were fabricated in the same manner as in Example 1 except for making cuts in the aluminum foil such that the width of the cut line is 3 mm. The measurement of leakage current and the reflow test were performed in the same manner. The results obtained are shown in Table 2.

TABLE 1

|  | Waveform | Frequency (Hz) | Current Density ($A/cm^2$) | Quantity of Electricity ($C/cm^2$) | Width (mm) | Acute Angle A (degree) |
|---|---|---|---|---|---|---|
| Ex. 1 | sine | 30 | 0.5 | 400 | 0.2 | 90 |
| Ex. 2 | sine | 30 | 0.5 | 650 | 0.2 | 90 |
| Ex. 3 | sine | 30 | 0.5 | 400 | 0.2 | 90 |
| Ex. 4 | sine | 30 | 0.5 | 400 | 0.2 | 90 |
| Ex. 5 | sine | 30 | 0.5 | 400 | 0.2 | 90 |
| Ex. 6 | triangular | 30 | 0.5 | 400 | 0.2 | 90 |
| Ex. 7 | rectangular | 30 | 0.5 | 400 | 0.2 | 90 |
| Compar. Ex. 1 | — | — | — | — | — | 90 |
| Compar. Ex. 2 | sine | 30 | 0.5 | 400 | 0.2 | 20 |
| Compar. Ex. 3 | sine | 30 | 0.5 | 400 | 3.0 | 90 |

TABLE 2

|  | r (μm) | T2/T1 | Average Capacitance (μF) | Capacitance Defective Ratio* | Welding Defective Ratio* | Leakage Current Defective Ratio* | Average Leakage Current (μA) |
|---|---|---|---|---|---|---|---|
| Ex. 1 | 52 | 0.7 | 63.5 | 0/150 | 0/150 | 0/150 | 0.15 |
| Ex. 2 | 52 | 0.7 | 93.2 | 0/150 | 0/150 | 0/150 | 0.18 |
| Ex. 3 | 52 | 0.7 | 62.2 | 3/150 | 3/150 | 2/150 | 0.17 |
| Ex. 4 | 52 | 0.7 | 63.6 | 0/150 | 0/150 | 0/150 | 0.15 |
| Ex. 5 | 52 | 0.7 | 63.5 | 0/150 | 0/150 | 0/150 | 0.15 |
| Ex. 6 | 48 | 0.6 | 61.0 | 0/150 | 0/150 | 0/150 | 0.10 |
| Ex. 7 | 47 | 0.6 | 62.5 | 0/150 | 0/150 | 0/150 | 0.14 |
| Compar. Ex. 1 | 0 | 0.0 | 27.1 | 5/150 | 5/150 | 22/150 | 1.89 |
| Compar. Ex. 2 | 10 | 0.3 | 59.0 | 0/150 | 0/150 | 5/150 | 0.78 |
| Compar. Ex. 3 | 89 | 2.8 | 50.7 | 1/150 | 0/150 | 10/150 | 0.95 |

*number of defective units/number of units evaluated

INDUSTRIAL APPLICABILITY

According to the present invention, the following effects are obtained.

(1) By making cut lines in a partial shape of a capacitor element before etching process, a valve-acting metal foil for capacitor elements, uniform in effective area, can be obtained, so that porous valve-acting metal, with narrow variation in capacitance, may be prepared.

A porous layer is formed also on the cut edge surface of a porous valve acting metal in the portion where at least an electrically conducting polymer is formed, and the sharp-edged corner part of the cut part dissolves by etching and forms a curved face, a high capacitor capacitance can be obtained and the generation of defectives due to increase in the leakage current after molding and reflow can be prevented.

(2) A porous layer being not formed on the anode-leading-out-part, no electrically conducting polymer is formed on the anode-leading-out-part by a capillary phenomenon in the chemical polymerization, therefore, short circuit due to the formation of an electrically conducting polymer does not occur and the welding at the stacking of elements is facilitated, as a result, defectives due to welding failure decrease, the contact resistance becomes small and a capacitor having a small equivalent series resistance can be obtained.

The invention claimed is:

1. A method for producing a metal foil for capacitors, comprising a step of making cut lines in a valve-acting metal foil in a shape of a capacitor element with at least a part of a portion predetermined to be anode-leading-out-part left uncut, a step of etching the cut edge surface generated in the previous step and the surface part of the valve-acting metal foil, and a step of electrochemically forming the metal foil.

2. The method for producing a metal foil for capacitors as claimed in claim 1, wherein the etching is performed after protecting the portion predetermined to be the anode-leading-out-part of a capacitor element with a protective material.

3. The method for producing a metal foil for capacitors as claimed in claim 2, wherein the protective material is removed after etching the valve-acting metal foil, and then the step of electrochemically forming is performed.

4. The method for producing a metal foil for capacitors as claimed in claim 2, wherein the protective material is removed after electrochemically forming the etched foil.

5. The method for producing a metal foil for capacitors as claimed in claim 2, wherein the protective material is removed after etching, and masking is applied to the boundary between the anode-leading-out-part and the region to have a solid electrolytic layer formed thereon to serve as a cathode part before performing the step of electrochemically forming the region to be a cathode part.

6. The method for producing a metal foil for capacitors as claimed in claim 1, wherein each of the cut portions has a quadrangular-shape having uncut portion, U-shape(horse-shoe-shape) or semicircular shape.

7. The method for producing a metal foil for capacitors as claimed in claim 1, wherein the cut edge surface has an acute interior angle A of 3° or more with respect to the metal foil surface.

8. The method for producing a metal foil for capacitors as claimed in claim 1, wherein the width d of the cut line is twice or less the thickness of the metal foil.

9. The method for producing a metal foil for capacitors as claimed in claim 1, wherein a plurality of capacitors is produced in a single batch process by making plurality of cut lines each having a shape of a capacitor element in a single valve-acting metal foil.

10. The method for producing a metal foil for capacitors as claimed in claim 1, wherein the foil consists of at least one valve-acting metal selected from a group of aluminum, niobium and tantalum.

11. The method for producing a metal foil for capacitors as claimed in claim 1, wherein the valve-acting metal foil has a thickness of 0.05 to 1 mm.

12. The method for producing a metal foil for capacitors as claimed in claim 1, wherein the valve-acting metal foil is an aluminum foil containing at least one element selected from the group consisting of Si, Fe, Cu, Zn, Ni, Mn, Ti, Pb, B, P, V and Zr.

13. The method for producing a metal foil for capacitors as claimed in claim 12, wherein the total content of the elements other than aluminum contained in the foil is from 1 to 1,000 ppm by mass.

14. The method for producing a metal foil for capacitors as claimed in claim 12, wherein the aluminum foil contains Si in an amount of 1 to 100 ppm by mass, Fe in an amount of 1 to 100 ppm by mass and Cu in an amount of 1 to 100 ppm by mass.

15. The method for producing a metal foil for capacitors as claimed in claim 1, wherein the etching is AC electrolytic etching using at least one waveform selected from the group consisting of sine wave, rectangular wave and triangular wave.

16. The method for producing a metal foil for capacitors as claimed in claim 1, wherein the etching is AC electrolytic etching where terminals are provided on the valve-acting metal and on electrodes placed to both sides of the valve-acting metal and AC current is directly supplied to the terminal provided on the valve-acting metal.

17. The method for producing a metal foil for capacitors as claimed in claim 1, wherein the etching is DC electrolytic etching.

18. A metal foil for capacitors, obtained by the production method according to claim 1.

19. The metal foil for capacitors as claimed in claim 18, wherein the edge of the cut portion has a curvature radius r of 0.1 to 500 μm.

20. The metal foil for capacitors as claimed in claim 18 above, comprising, on the surface of the metal foil and the cut edge surface, porous layers formed on a portion where solid electrolyte is to be formed, wherein the thickness of the porous layer on the cut edge surface, T2, is more than 1 μm, and has a following relationship with the thickness of the porous layer on the surface of the metal foil, T1:

$$T2/T1 \leq 2$$

21. A solid electrolytic capacitor element, comprising a solid electrolyte layer and an electrically conducting layer in the order on the metal foil according to claim 18.

22. A multilayer solid electrolytic capacitor obtained by stacking a plurality of capacitor elements according to claim 21.

23. The solid electrolytic capacitor element as claimed in claim 21, wherein the solid electrolyte layer comprises an electrically conducting polymer.

24. The solid electrolytic capacitor element as claimed in claim 23, wherein a monomer forming the electrically conducting polymer is a monomer compound containing a heterocyclic 5-membered ring or a monomer compound having an aniline skeleton.

25. The solid electrolytic capacitor element as claimed in claim 24, wherein the monomer compound containing a heterocyclic 5-membered ring is a compound selected from the group consisting of pyrrole, thiophene, furan, polycyclic sulfide and substitution derivatives thereof.

26. The solid electrolytic capacitor element as claimed in claim 24, wherein the monomer compound containing a heterocyclic 5-membered ring is a compound represented by the following formula (I):

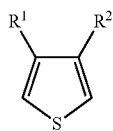

(I)

wherein the substituents $R^1$ and $R^2$ each independently represents a monovalent group selected from the group consisting of a hydrogen atom, a linear or branched, saturated or unsaturated hydrocarbon group having a carbon number of 1 to 10, an alkoxy group, an alkyl ester group, a halogen, a nitro group, a cyano group, a primary, secondary or tertiary amino group, a $CF_3$ group, a phenyl group and a substituted phenyl group, the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by the groups $R^1$ and $R^2$, and the combined ring chain may arbitrarily contain a bond of carbonyl, ether, ester, amide, sulfide, sulfinyl, sulfonyl or imino.

27. The solid electrolytic capacitor element as claimed in claim 24, wherein the monomer compound containing a heterocyclic 5-membered ring is a compound selected from 3,4-ethylenedioxythiophene and 1,3-dihydroisothianaphthene.

28. A method for producing solid electrolytic capacitor elements, comprising a step of making cut lines each having a shape of a capacitor element with at least a part of a portion predetermined to be anode-leading-out-part left uncut in a valve-acting metal foil, a step of etching the cut edge surface generated in the previous step and the surface of the valve-acting metal foil, a step of electrochemically forming the etched metal foil to form an oxide dielectric film after cutting the foil into stripes each having a comb-like shape where foil portions each cut in a shape of an element link together in anode-leading-out-parts, a step of forming a solid electrolyte layer on the oxide dielectric film layer, a step of forming an electrically conducting layer on the solid electrolyte layer, and a step of severing the foil pieces each in a shape of a capacitor element by making a cut in the anode-leading-out-part of each piece.

* * * * *